April 18, 1933.  S. B. HASELTINE  1,904,369
HAND BRAKE
Filed Feb. 9, 1931   2 Sheets-Sheet 1
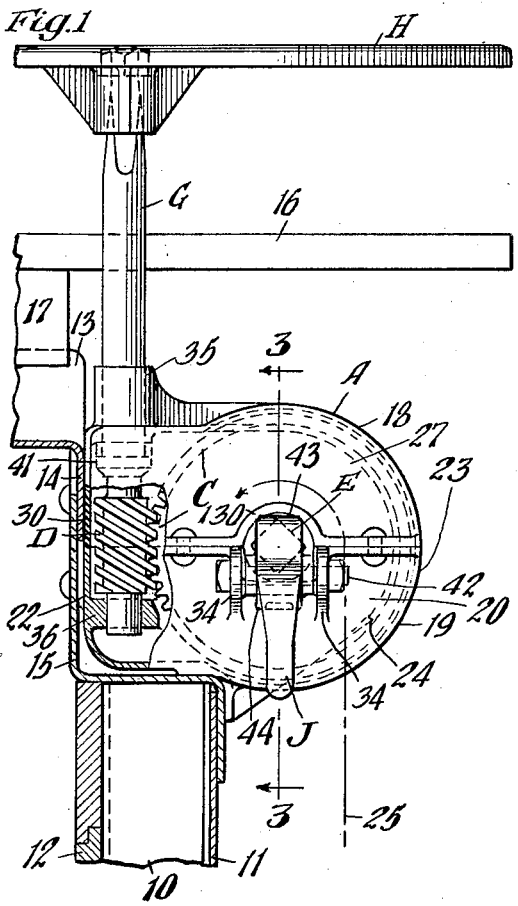
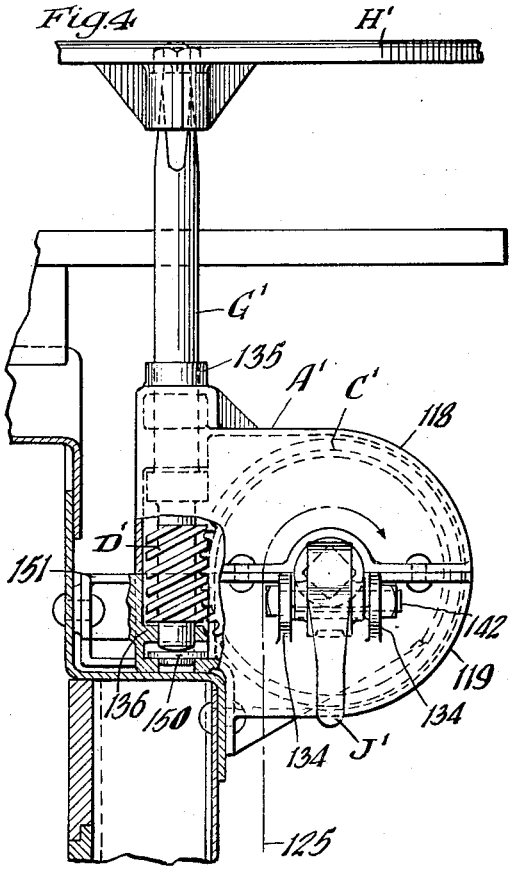
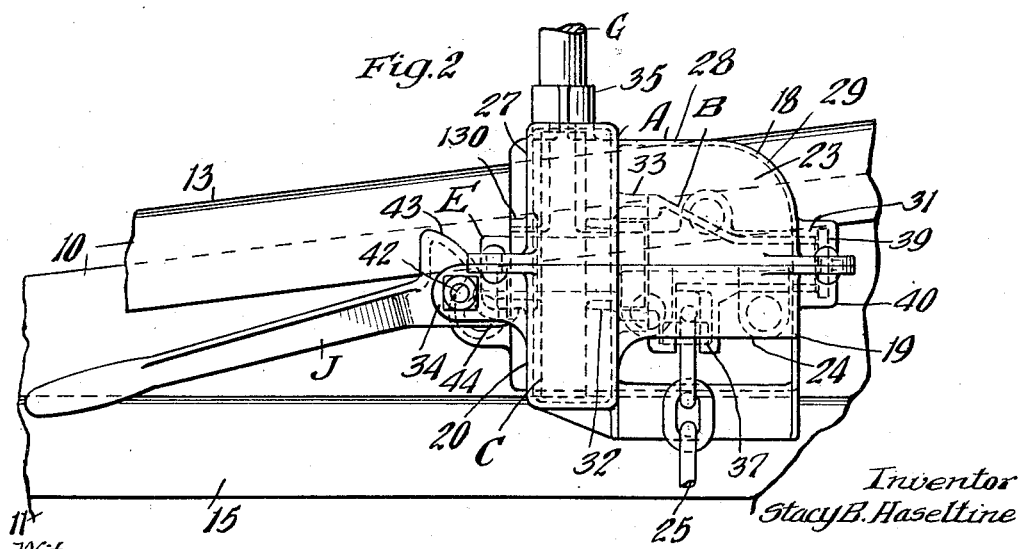
Inventor
Stacy B. Haseltine
Witness
Wm. Geiger
By Henry Fuchs
Atty.

April 18, 1933.  S. B. HASELTINE  1,904,369
HAND BRAKE
Filed Feb. 9, 1931  2 Sheets-Sheet 2
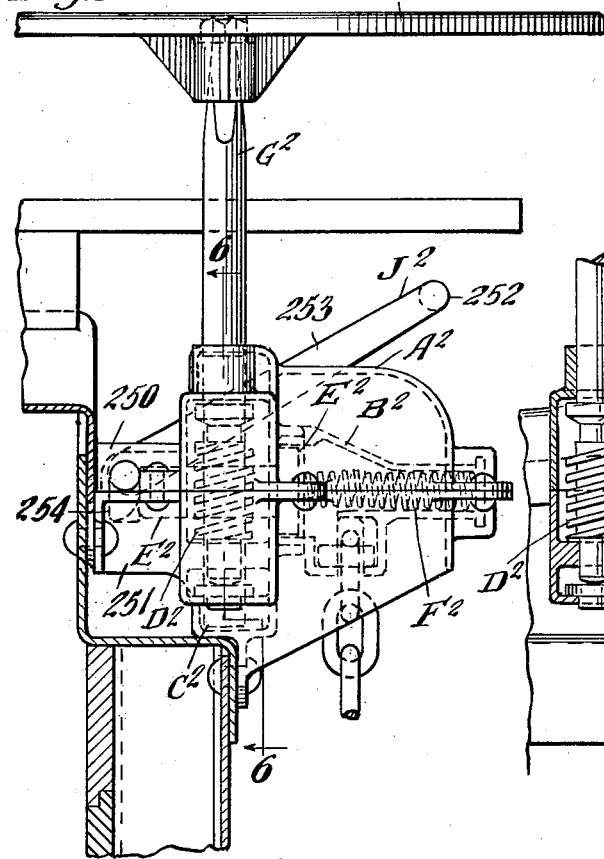
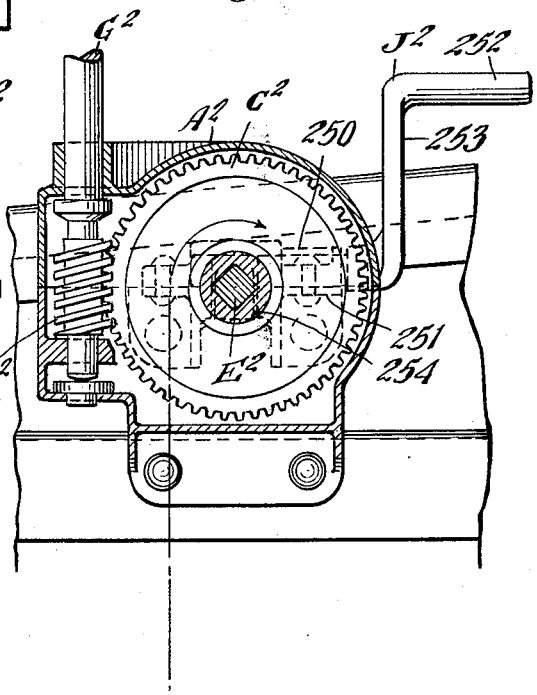
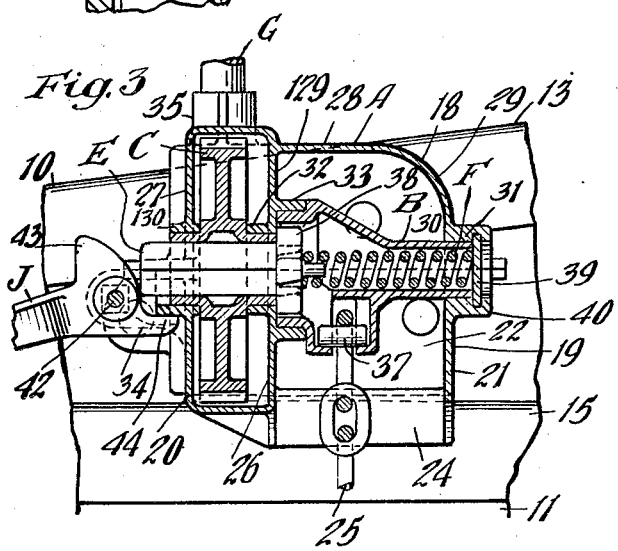
Inventor
Stacy B. Haseltine
By Henry Fuchs
Atty.
Witness
Wm. Geiger Patented Apr. 18, 1933

1,904,369

UNITED STATES PATENT OFFICE

STACY B. HASELTINE, OF CHICAGO, ILLINOIS, ASSIGNOR TO W. H. MINER, INC., OF CHICAGO, ILLINOIS, A CORPORATION OF DELAWARE

HAND BRAKE

Application filed February 9, 1931. Serial No. 514,464.

This invention relates to improvements in hand brakes.

One object of the invention is to provide a simple and efficient hand brake mechanism, which is of compact design and is mounted as a unit on the end of the car closely adjacent the top thereof, the unitary mechanism including a chain winding element, power-multiplying gearing, and operating means comprising a vertically disposed operating shaft provided with the usual actuating hand wheel.

A further object of the invention is to provide a mechanism of the character indicated in the preceding paragraph, wherein the unit includes an enclosing housing carrying all the bearing members for the various parts, and particularly for the vertical operating shaft, thereby permitting the use of the minimum number of bearing supports for the latter and the placing of said bearing supports closely adjacent each other, thus avoiding entirely any binding in the bearings, which would ordinarily occur in connection with a relatively long operating shaft, as employed in the usual vertical staff type of brakes, due to the flexing and bending of such a long shaft.

A still further object of the invention is to provide a unitary brake mechanism of the character indicated, so designed as to be mounted closely adjacent the top of the car, thereby permitting the use of a vertical operating shaft of minimum length and entirely eliminating the necessity for any additional bearing brackets for supporting the upper portion of the shaft.

Another object of the invention is to provide a unitary hand brake mechanism of the character indicated, which is of compact design, and so mounted on the end of the car that the vertical operating shaft, which carries the operating hand wheel, is disposed inwardly of the end wall of the car, thereby permitting the use of an operating hand wheel of maximum diameter without encroaching upon the prescribed clearances for accessories of cars.

A further object of the invention is to provide a hand brake mechanism of the power-multiplying chain winding type, wherein the mechanism is actuated by a vertical shaft carrying the usual operating hand wheel, and free running of the chain winding element is had during release of the brakes without movement of the hand wheel, through the employment of manually actuated clutch means, the entire mechanism being so mounted on the end of the car as to render the actuating means for the clutch, as well as the operating hand wheel, readily accessible to the brakeman.

Other objects of the invention will more clearly appear from the description and claims hereinafter following.

In the drawings, forming a part of this specification, Figure 1 is a longitudinal, vertical, sectional view through the upper portion of the end of a railway box car, illustrating my improved hand brake mechanism in connection therewith, said mechanism being shown partly in side elevation and partly in vertical section. Figure 2 is an end elevational view of the structure illustrated in Figure 1. Figure 3 is a vertical, sectional view corresponding substantially to the line 3—3 of Figure 1. Figure 4 is a view similar to Figure 1, illustrating a different embodiment of the invention. Figure 5 is a view similar to Figure 1, illustrating still another embodiment of the invention. And Figure 6 is a vertical, sectional view, corresponding substantially to the line 6—6 of Figure 5.

Referring first to the embodiment of the invention illustrated in Figures 1, 2 and 3, 10 designates broadly a railway box car of well known type. As shown, the end wall of the car comprises a vertically disposed, metallic panel or sheet 11 and the usual lining 12, which forms the interior portion of the end wall of the car. The roof of the car is designated by 13 and as shown comprises metal sheets or plates having downturned rear end sections 14, which are connected to the sheet or plate 11 by means of a Z-shaped metal plate 15. As shown, the metal plate 15 has the inner vertical section thereof secured to the downturned portion 14 of the roof member and is in substantially vertical alinement with the lining 12. The downturned section of the plate 15 is secured in any suitable manner to the upper end portion of the plate or sheet 11. An offset portion is thus formed at the top of the end wall structure of the car, as clearly shown in Figures 1, 2 and 3. The car is provided with the usual running board 16, which is supported by spaced blocks 17, in a well known manner.

My improved hand brake mechanism, as shown in Figures 1, 2 and 3, comprises broadly a housing A enclosing a chain winding drum B; a worm wheel C; a worm D; a sliding clutch member E; a clutch spring F; a vertical, operating shaft G, which extends into the housing and actuates the worm member; a hand wheel H fixed to the operating shaft; and a clutch actuating lever J swingingly supported on the housing.

The housing A is of two part construction, comprising top and bottom sections 18 and 19, divided on a horizontal plane. The two sections are provided with laterally projecting flanges at their meeting edges, by which the same are secured together. As shown in the drawings, the flanges are preferably joined by rivets. The bottom section of the housing has spaced, vertical side walls 20 and 21, a vertical rear wall 22 and a curved front wall 23. The housing section 19 is open at the bottom, as indicated at 24, to accommodate the usual brake chain for movement, said brake chain being indicated at 25 and being connected to the brake mechanism proper of the car in the usual manner. The housing section 19 is divided into two compartments by means of a vertical partition wall 26, as clearly shown in Figure 3. The top section 18 of the housing has a vertical side wall 27 in alinement with the wall 20, a top wall 28 and a curved side wall 29 opposed to the wall 27 and having the lower portion thereof in vertical alinement with the wall 21, as shown in Figure 3. The top section of the housing is also divided into two compartments by means of a transverse partition wall 129, which is in vertical alinement with the partition wall 26 of the housing section 19. The section 18 of the housing also has the vertical back wall 30 in alinement with the wall 22 of the bottom section. At their upper ends, the walls 20, 21 and 26 of the bottom section 19 are provided with partial bearing members, which together with partial bearing members formed at the lower ends of the walls 27, 29 and 129 of the top section 18 form complete bearing members 130, 31 and 32 for the parts of the mechanism contained within the housing. The partition walls 26 and 129 of the bottom and top sections of the housing are further provided with curved flange members, which together define a bearing member 33 of larger internal diameter than the bearing member 32.

The housing is seated in the inwardly offset section of the end wall of the car, as clearly shown in Figure 1, and is secured to the upper section of said end wall in any suitable manner, being preferably riveted thereto, as clearly shown in Figures 1 and 3. At the lefthand side, the bottom section 19 of the housing is provided with a pair of outstanding ears or lugs 34—34, which serve to support the clutch operating lever mechanism, as hereinafter pointed out. The top wall 28 of the housing is provided with a bearing opening 35 adapted to accommodate the vertical shaft of the brake mechanism, said opening being suitably reinforced by a sleevelike section, as shown in Figure 1. The bottom section of the housing is provided with a laterally projecting, interior bearing member 36, having a bearing opening adapted to receive the bottom end portion of the vertical operating shaft.

The chain winding drum B is of hollow construction and has its opposite ends rotatably supported in the bearing members 31 and 33, as clearly shown in Figure 3. The brake chain 25 is attached to the chain winding drum by means of a removable pin 37, extending through the end link of the chain and seated in a pocket provided on the winding section of the drum proper.

The worm wheel C is disposed within the lefthand compartment of the housing, as shown in Figure 3, and has journal portions at opposite sides of the hub thereof, which are mounted in the bearing members 130 and 32. The hub section of the worm wheel is provided with an opening of substantially square cross section, which accommodates the sliding clutch member E. The clutch member E has a clutch head 38, which is disposed within the hollow of the chain winding drum and has clutch projections which cooperate with clutch teeth formed on the interior of the corresponding end of the drum. The shank of the clutch member E, as clearly shown in Figure 3, is of substantially square cross section and is slidably fitted within the square opening of the hub of the worm wheel C. The clutch is normally held in the position shown in Figure 3 by the clutch spring F, which is interposed between the clutch head 38 and a retaining disc 39, seated in grooves provided in a projecting boss 40 of the top and bottom sections of the housing, which boss forms a continuation of the bearing member 31.

The vertical operating shaft G has the worm member D formed integral therewith and has the projecting lower end portion thereof journaled in the bearing member 36. Above the worm member D, the shaft is journaled in the bearing member 35 of the top section 18 of the housing. A collar 41, which is preferably formed integral with the shaft G, abuts the bottom of the bearing member 35, thereby holding the shaft against vertical displacement. At the upper end, the operating shaft G carries the hand wheel H, which may be detachably secured thereto in any well known manner. In the present instance, the operating shaft G is shown as provided with a tapered upper end portion of square cross section, fitting within a similarly formed opening of the hub of the hand wheel. The usual nut member at the upper end of the shaft is employed to hold the hand wheel in position.

The clutch actuating lever J is swingingly supported by means of a transverse bolt or pin 42, extending through the inner end of the lever and the ears 34—34. At the inner end, the lever is provided with a cam head 43, which cooperates with the projecting end portion of the shank of the clutch member E is a manner hereinafter pointed out. In order to limit the downward swinging movement of the clutch actuating lever J, the head of the same is provided with an inwardly projecting finger 44, which engages beneath the flange portion at the upper edge of the bottom section 19 of the housing.

The operation of the hand brake mechanism as illustrated in Figures 1, 2 and 3, is as follows: In tightening the brakes, the hand wheel H is rotated in a clockwise direction, as viewed from the top of the car. Through the medium of the operating shaft G, the worm D is rotated in the same direction as the hand wheel, thereby actuating the chain winding drum B in the direction indicated by the arrow in Figure 1, and winding the chain thereon. The chain 25 is indicated by dotted lines in said figure. To release the brakes, the clutch lever J is lifted, thereby causing the clutch member E to be forced to the right, as viewed in Figure 3, by means of the cam head 43. Displacement of the clutch member E, as pointed out, disengages the teeth or clutch projections thereof from the cooperating teeth of the chain winding drum B, thereby disconnecting the drum from the worm wheel C and permitting free rotation of the former without imparting any movement to the worm gearing, the operating shaft G and the hand wheel H. Upon releasing the clutch actuating lever, the same drops to the position shown in Figure 3 and the spring F, which has been compressed during disengagement of the clutch, returns the clutch to the position shown in said figure, thereby again operatively connecting the worm wheel C and the winding drum. As will be obvious, in case it is desired to ease off or back up the brakes, the hand wheel is rotated in a reverse direction.

Referring next to the embodiment of the invention, as illustrated in Figure 4, the same comprises a housing A′, similar to the housing A hereinbefore described, which encloses the operative parts of the hand brake mechanism, being mounted on the end wall of the car at the offset portion thereof. The mechanism of Figure 4 is substantially the same as that hereinbefore described in connection with Figures 1, 2 and 3, with the exception that the chain winding drum is adapted to be rotated in a direction reverse to the direction of rotation of the drum B, hereinbefore described. The housing A′ is of two part construction, comprising top and bottom sections 118 and 119, similar to the two sections hereinbefore described in connection with Figures 1, 2 and 3, and containing a chain winding drum and a worm wheel C′, corresponding in all respects to the chain winding drum B and the worm C, hereinbefore described and mounted in a similar manner. The worm wheel C′ and the chain winding drum are operatively connected by a sliding clutch member identical with the member E, hereinbefore referred to in connection with Figures 1, 2 and 3, said member being maintained in clutching position by a spring, similar to the spring F. The clutch mechanism is actuated by a lever J′, corresponding to the lever J. The lever J′ is supported on a pair of ears 134—134, formed on the lower section 119 of the housing, by means of a bolt 142 extending through said ears and the inner end of the lever J′. The mechanism includes a vertically disposed operating shaft G′, which extends into the housing and is journaled in an upper bearing member 135 on the top section of the housing and a lower bearing member 136 formed on the bottom section. As shown in Figure 4, a supporting wear plate or disc 150 is employed on which the lower end of the shaft G′ rests, said lower end being rounded off, as shown. The shaft G′ is provided with a worm member D′ formed integral therewith. The worm member D′ is reversely threaded to the worm member D, that is the worm member D is provided with lefthand threads, while the worm member D′ has right threads. The teeth of the worm wheel C′ are formed so as to properly cooperate with the righthand threads of the worm member D′. As will be evident, when the hand wheel H′ of the brake mechanism, shown in Figure 4, is rotated in a clockwise direction, the righthand worm D′ will cause rotation of the chain winding drum in the direction of the arrow. The brake chain, which is indicated by 125, is thus disposed between the chain winding drum and the end wall of the car, while in the form of the invention shown in Figures 1, 2 and 3, the chain is disposed outwardly of the winding drum. In order to provide proper clearance for the chain, the housing A′ has a bracket extension 151 at the back of the bottom section 119, by which the housing is secured to the upper section of the vertical end wall of the car. Release of the brakes shown in Figure 4 is effected in a manner similar to that described in connection with Figures 1, 2 and 3.

Referring next to the embodiment of the invention illustrated in Figures 5 and 6, my improved hand brake mechanism comprises a housing $A^2$; a chain winding drum $B^2$; a worm gear $C^2$; a worm $D^2$; a sliding clutch member $E^2$; a clutch spring $F^2$; a vertical operating shaft $G^2$; a hand wheel $H^2$ and a clutch operating lever $J^2$.

The chain winding drum $B^2$ is of similar design to the drum B hereinbefore described and is operatively connected to the worm wheel $C^2$ by means of the clutch member $E^2$. The clutch is held in engagement with the cooperating clutch teeth of the winding drum $B^2$ by means of the spring $F^2$. The worm wheel $C^2$ cooperates with a worm member $D^2$, which is formed on the shaft $G^2$, which carries the hand wheel $H^2$ at the upper end thereof. The arrangement and construction of the entire brake mechanism shown in Figures 5 and 6 is broadly the same and operates in the same manner as the construction described in connection with Figures 1, 2 and 3, differing therefrom only in that the chain winding drum is rotatable about an axis at right angles to the plane of the end wall of the car instead of about a horizontal axis parallel to said end wall, and further in that the clutch operating lever means is of slightly different design. The housing $A^2$, which encloses the operating parts of the hand brake mechanism of Figures 5 and 6 is also of two part construction and is divided along a horizontal plane and has the various part bearing members for the drum and worm wheel formed on the top and bottom sections, respectively. The top and bottom sections, as clearly shown in Figure 5, are provided with extensions 250 and 251 at the rear sides thereof, which serve to brace the housing and secure the same to the upper section of the vertical end wall of the car. The sections 250 and 251 house the cam portion of the clutch operating lever means $J^2$, said lever being in the form of a crank member, as clearly shown in Figure 6, having a handle or operating hand grip portion 252 and an offset section 253 having journaled portions mounted in part bearing members provided at the meeting edges of the sections 250 and 251. As indicated in Figure 5, the upper bearing members for the journal portions of the clutch actuating lever $J^2$ are in the form of openings provided in the lower edge of the section 250, said openings having substantially semi-cylindrical upper walls, which bear on said journal portions. The lower bearing sections for the journal portions of the member $J^2$ are formed by the flat upper surfaces of the flanges of the lower section 251. The section 253 of the lever $J^2$ carries a cam head 254 which cooperates with the projecting end portion of the shank of the clutch member $E^2$ in a manner similar to the cam member hereinbefore described in connection with the lever J in Figures 1, 2 and 3. The back of the cam section 254 engages the back wall of the housing members to limit the downward swinging movement of said clutch lever.

From the preceding description taken in connection with the drawings, it will be evident that I have provided a hand brake mechanism of the vertical staff or shaft type, which may be bodily applied to railway box cars. Further, the entire mechanism is self-contained and no additional bearing means is required to properly support the vertical operating shaft. The compact arrangement and mounting of the brake mechanism at the top of the car further permit the use of an operating shaft of minimum length, thereby entirely eliminating the danger of binding of the shaft in the bearings due to unavoidable bending of the same, which is the case where excessively long operating shafts are used, extending from the top to the bottom of the car. Further, utilization of the inwardly offset upper wall section of the car, to accommodate the brake mechanism, makes it possible to dispose the operating shaft inwardly of the main body portion of the end wall of the car, thus making available the maximum space for the hand wheel without encroaching upon prescribed clearances for such accessories, thereby permitting the employment of a hand wheel of large diameter and correspondingly increasing the leverage.

I have herein shown and described what I now consider the preferred manner of carrying out my invention, but the same is merely illustrative and I contemplate all changes and modifications that come within the scope of the claims appended hereto.

I claim:

1. In a hand brake mechanism for railway cars adapted to be mounted on the end wall of the car, which end wall has an offset section, the combination with a vertically disposed operating shaft disposed adjacent to the end wall of the car above said offset section and inwardly of the plane of said offset section, said shaft extending above the top of the car and having an operating hand wheel secured to the upper end thereof, said shaft having a worm member fixed thereto having right hand threads thereon; of a chain winding drum rotatable about a horizontal axis parallel to the end wall of the car and disposed outwardly beyond said operating shaft and outwardly of said offset section of the wall; a worm wheel fixed to said drum and rotatable about the same axis, said worm wheel being operatively engaged with said worm member; and means secured to the car wall above said offset section and inwardly thereof for supporting said drum, worm wheel, worm, and operating shaft with the shaft and worm disposed inwardly of the axis of rotation of said drum and between the same and the end wall section to which the supporting means is secured.

2. In a hand brake mechanism for railway cars adapted to be mounted on the end wall of the car, which end wall has an outwardly offset portion, the combination with a vertically disposed operating shaft adjacent to said end wall inwardly of said offset portion, extending above the top of the car and having an operating hand wheel secured to the upper end thereof, said shaft having a worm member fixed thereto having left hand threads thereon; of a chain winding drum rotatable about a horizontal axis parallel to the end wall of the car, the winding section of said drum being disposed outwardly beyond the offset section of the wall; a worm wheel fixed to said drum and rotatable about the same axis, said worm wheel being operatively engaged with said worm member; and means for supporting said drum, worm wheel, worm, and operating shaft on the end wall of the car above said offset section with the shaft and worm disposed inwardly of the axis of rotation of the drum between said axis and the end wall section to which said supporting means is secured.

3. In a hand brake mechanism for railway box cars having a vertical end wall comprising an upper section and an outwardly offset main body portion; of a housing fixed to said end wall at the upper section thereof; a chain winding drum within the housing rotatable about a horizontal axis parallel to the plane of the end wall of the car, said drum being disposed outwardly of the plane of the main body portion of said wall; a vertically disposed operating shaft journaled in said housing and having the axis of rotation thereof disposed inwardly of the plane of the main body portion of said end wall; an operating hand wheel fixed to the upper end of said shaft; and gear means operatively connecting said shaft and drum.

In witness that I claim the foregoing I have hereunto subscribed my name this 6th day of February, 1931.

STACY B. HASELTINE.